(No Model.)

J. M. WILKINSON.
Animal Trap.

No. 233,452. Patented Oct. 19, 1880.

Witnesses.
A. Rippert.
Jas. H. Lange.

J. M. Wilkinson.
Inventor.
per Eakin Brothers
Attorneys

UNITED STATES PATENT OFFICE.

JOHN M. WILKINSON, OF TREZEVANT, TENNESSEE.

ANIMAL-TRAP.

SPECIFICATION forming part of Letters Patent No. 233,452, dated October 19, 1880.

Application filed July 7, 1880. (No model.)

*To all whom it may concern:*

Be it known that I, JOHN M. WILKINSON, of Trezevant, in the county of Carroll and State of Tennessee, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to that class of animal-traps in which a baited trigger operates a hook and releases the platform on which the animal stands when he troubles the bait. The platform falls, precipitating the animal into a prison-box or drowning-vat.

The novelty consists in the construction and arrangement of parts, as will be more fully hereinafter set forth.

The great object of this invention is to simplify, and consequently cheapen, the cost of manufacture. An animal-trap, especially a vermin-trap, is an article more needed among the poorer classes, who reside in cheaply-constructed tenements, than in the dwellings of the wealthy. Consequently, it is a great desideratum to produce such a construction as will not only simplify and cheapen the manufacture, but will at the same time attain the same or better results.

To this end my invention consists in a rectangular box having a floor pivoted to the sides of the box, near the rear end, the front being supported by a weighted catch pivoted in a simple saw-kerf in the front end of the box, and being weighted at the rear to return it to a "set" condition. Upon a wire staple above is hung a bait-trigger, which embraces the standard of the catch at one end, and presents two bait-hooks at the other, enabling the party to employ different kinds of bait. This bait-trigger is made of one piece of wire, bent upon itself and around the staple-shaft, as shown. It will be observed that the entire operating portion of the trap is formed of simple bent wire. In fact, wooden slabs and common wire with weights are all that is necessary for its construction. As soon as the weighted catch has released the trap-floor the floor descends, precipitating the vermin into the prison or vat, the catch resumes its former position, and the floor returns to a set for another animal.

Figure 1:
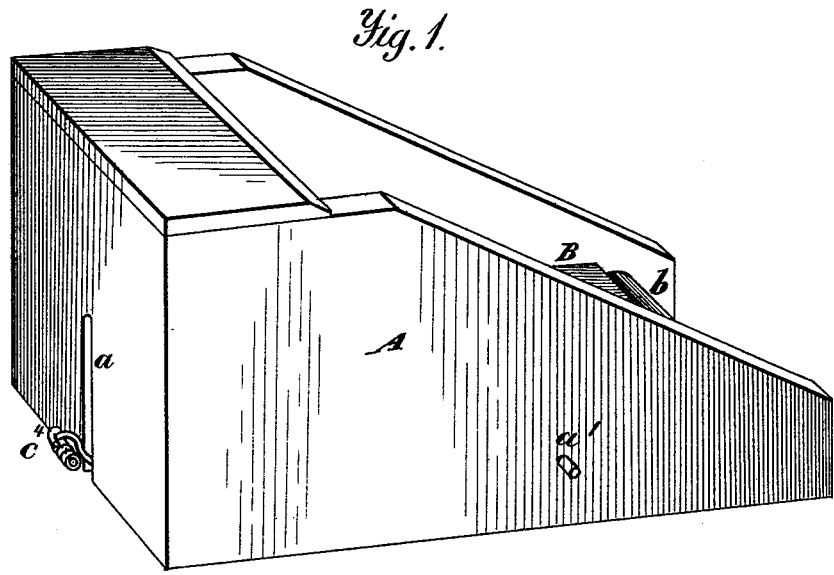
Figure 2:
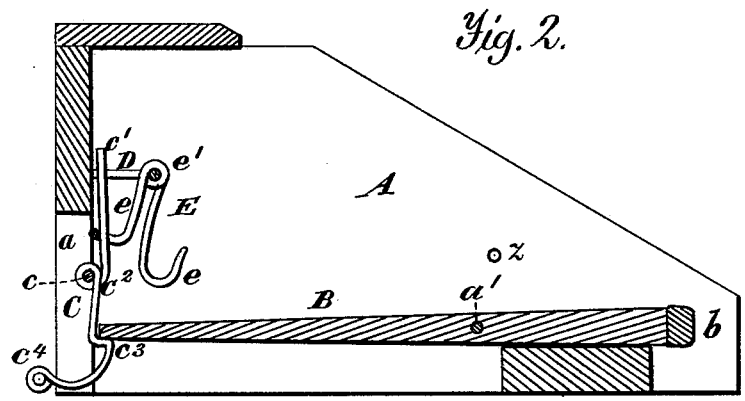
Figures 3, 4:
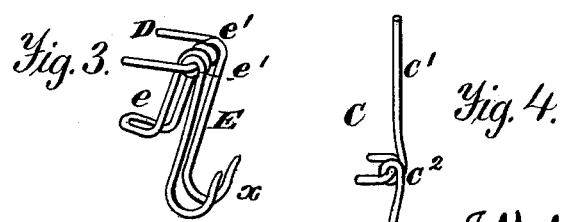

In the drawings, Figure 1 is a perspective view of my trap. Fig. 2 is a longitudinal vertical section; and Figs. 3 and 4 are detached views, showing the bait-hooks and the catch for the trap-floor.

Referring to the drawings, A represents a rectangular box having a saw-kerf, $a$, in its front end; and pivoted at $a'$ is a trap-floor, B, having upon its rear end a weight, $b$. This floor is of gradually-diminishing thickness from rear to front, not only to assist in a proper balance to the floor, but to give a light thin end forward for delicate operation.

Pivoted at $c$ in the kerf $a$ is a lever-catch consisting of the shank $c'$, eye $c^2$, catch $c^3$, and weight $c^4$. The whole I will designate by the letter C. This catch C is made of a single piece of wire twisted and bent as shown.

D represents a staple above the upper end of the kerf $a$, and upon it is hung a bait-trigger, E, made of a single piece of wire and bent as shown. This bait-trigger is composed of the loop $e$, made at the center of the piece of wire, the eyes $e'$, which embrace the shaft of the staple D, and the double bait-hooks $x$, formed upon the two ends, allowing different kinds of bait to be used at the same time—an important feature with some kinds of shy animals.

$z$ represents a stop to catch the door and keep the weight on the proper side of a vertical line and allow its prompt return.

The important features of my invention are, first, the gradually-diminishing thickness of the trap-floor; second, the entire operating parts made of wire, cheap, simple, and easy of manufacture and application; third, the catch C made of a single piece of wire; fourth, the bait-trigger made of a single piece of wire; fifth, the double bait-hooks, for the purposes set forth; and, sixth, the stop $z$, to hold the door from passing a vertical line.

I am aware of the Patent No. 133,836, of December 10, 1872, and upon that construction this invention is designed as an improvement.

What I claim is—

The animal-trap herein described, consisting of the box A, having saw-kerf $a$, the trap-floor B, pivoted at $a'$, and having the weight $b$, said floor being of a gradually-diminishing thickness from rear to front, the catch C, consisting of the parts $c'$ $c^2$ $c^3$ $c^4$, and formed of a single piece of wire, the staple D, the bait-trigger E, composed of the loop $e$, eyes $e'$, and furnishing double bait-hooks $x$, also made of a single piece of wire, and the stop $z$, the whole constructed, arranged, and adapted to operate as and for the purposes herein specified.

In testimony that I claim the foregoing I have hereunto set my hand this 15th day of June, 1880.

JOHN MARION WILKINSON.

Witnesses:
    GREEN ROBINSON,
    T. H. MARSHALL.